(12) United States Patent
Kuroki et al.

(10) Patent No.: US 8,943,806 B2
(45) Date of Patent: Feb. 3, 2015

(54) WORKING GAS CIRCULATION ENGINE

(75) Inventors: Rentaro Kuroki, Susono (JP); Daisaku Sawada, Gotenba (JP); Akira Kato, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/001,545

(22) PCT Filed: Mar. 7, 2011

(86) PCT No.: PCT/JP2011/055215
§ 371 (c)(1),
(2), (4) Date: Aug. 26, 2013

(87) PCT Pub. No.: WO2012/120612
PCT Pub. Date: Sep. 13, 2012

(65) Prior Publication Data
US 2013/0333356 A1    Dec. 19, 2013

(51) Int. Cl.
*F01N 3/00* (2006.01)
*F01N 3/02* (2006.01)
*F01N 3/10* (2006.01)
*F01N 3/20* (2006.01)
*F02M 25/07* (2006.01)
*F02B 47/10* (2006.01)

(52) U.S. Cl.
CPC ............... *F02M 25/07* (2013.01); *F02B 47/10* (2013.01); *F02M 25/0731* (2013.01); *F02M 25/074* (2013.01); *F02M 25/0754* (2013.01); *Y02T 10/121* (2013.01)
USPC .................... 60/287; 60/285; 60/286; 60/288

(58) Field of Classification Search
USPC .................................. 60/287, 288, 285, 295
See application file for complete search history.

(56) References Cited

U.S. PATENT DOCUMENTS 8,272,371 B2 *   9/2012   Fasold et al. ............. 123/568.12
2009/0188476 A1   7/2009   Sasajima et al.

FOREIGN PATENT DOCUMENTS

| JP | 2008-008247 | 1/2008 |
| JP | 2008-64018 | 3/2008 |
| JP | 2009-281204 | 12/2009 |
| JP | 2010-209801 | 9/2010 |

* cited by examiner

*Primary Examiner* — Audrey K Bradley
*Assistant Examiner* — Dapinder Singh
(74) *Attorney, Agent, or Firm* — Finnegan, Henderson, Farabow, Garrett & Dunner, LLP

(57) ABSTRACT

In a working gas circulation engine, water vapor contained in exhaust gas after combustion is separated and removed at higher efficiency as compared with the conventional technology, the influence of remaining water vapor is prevented from reducing the ratio of specific heats of working gas and deteriorating the thermal efficiency of the engine.

A working gas circulation engine which comprises a circulation passage part which connects an inlet port communicated to a combustion chamber and an exhaust port communicated to the combustion chamber in the exterior of the combustion chamber, supplies fuel, oxygen, and working gas to the combustion chamber to burn the fuel in the combustion chamber, and supplies the working gas contained in the exhaust gas discharged through the exhaust port from the combustion chamber to the combustion chamber through the circulation passage part and the inlet port. The working gas circulation engine comprises a water vapor condensing means which interposes in said circulation passage part and has an entrance part and an exit part, the water vapor condensing means removes water vapor from gas flowing thereinto through the entrance part from said circulation passage part by condensing water vapor contained in the gas and discharges the gas from the exit part to said circulation passage part, a gas pressure detecting means to detect the pressure of the gas flowing into said water vapor condensing means, and a gas pressure adjusting means to adjust the pressure detected by said gas pressure detecting means.

7 Claims, 5 Drawing Sheets

WORKING GAS CIRCULATION ENGINE

CROSS-REFERENCE TO RELATED APPLICATIONS

This application is a national phase application of International Application No. PCT/JP2011/055215, filed Mar. 7, 2011, the content of which is incorporated herein by reference.

TECHNICAL FIELD

The present invention relates to a working gas circulation engine in which fuel, oxygen, and working gas are supplied to a combustion chamber and the fuel is burnt while the working gas in exhaust gas discharged from the combustion chamber is circulated (re-supplied) to the combustion chamber.

BACKGROUND ART

Conventionally, a working gas circulation engine in which fuel, oxygen, and working gas are supplied to a combustion chamber and the fuel is burnt while the working gas in exhaust gas discharged from the combustion chamber is circulated to the combustion chamber through a circulation pathway (circulation passage part) has been proposed. It is also known that it is desirable to use, as working gas, inactive gas with a large ratio of specific heats, such as argon, helium, etc. An engine using such gas with a large ratio of specific heats as working gas may be operated at higher thermal efficiency as compared with an engine using gas with a comparatively small ratio of specific heats as working gas (for example, air, nitrogen, etc.).

In the exhaust gas of a working gas circulation engine as mentioned above, product (hereinafter, may be referred to as "combustion product"; for example, water vapor ($H_2O$), carbon dioxide ($CO_2$). etc.) produced by combustion of fuel (for example, hydrogen, natural gas, etc.) and working gas (for example, argon, helium, etc.) are contained. Among these, especially, water vapor is gas of a three-atom molecule and its ratio of specific heats is smaller as compared with not only inactive gases of a single atom, such as argon and helium, but also air or nitrogen (refer to FIG. 1). Therefore, when exhaust gas containing water vapor with such a low ratio of specific heats is re-supplied to a combustion chamber as it is, the ratio of specific heats as the whole working gas will fall, and the thermal efficiency of the engine will fall as a result.

Then, conventional working gas circulation hydrogen engines are configured so that water vapor ($H_2O$) may be removed from exhaust gas by a condenser and the gas from which water vapor ($H_2O$) has been removed may be re-supplied to a combustion chamber to prevent the ratio of specific heats of working gas from falling (refer to, for example, PTL 1 and PTL 2).

CITATION LIST

[Patent Literature]

[PTL 1] Japanese Patent Application Laid-Open (kokai) No. 2008-8247

[PTL 2] Japanese Patent Application Laid-Open (kokai) No. 2008-64018

SUMMARY OF INVENTION

[Technical Problem]

As mentioned above, in a working gas circulation engine, it is necessary to remove water vapor contained in the working gas (circulating gas) to be re-supplied to a combustion chamber as much as possible to prevent the ratio of specific heats of the working gas from falling. However, since an exhaust gas is cooled in a condenser to condense and separate water vapor therefrom, an amount of water vapor equivalent to the amount of saturated water vapor corresponding to the temperature of the gas will necessarily remain in the working gas. Therefore, when the temperature of gas in a condenser (cooling temperature) becomes higher, for example, for the reasons of the rise in temperature of cooling water of the condenser resulting from the warming-up of the engine, the rise in ambient temperature, etc., the amount of the water vapor which remains in the gas will increase (refer to FIG. 2). As a result, the ratio of specific heats of the working gas falls under the influence of the remaining water vapor, and the thermal efficiency of the engine gets worse (refer to FIG. 3).

Therefore, in a working gas circulation engine, it is necessary to raise the thermal efficiency of engine further by improving the performance for condensing and separating water vapor contained in circulating gas in a condenser. That is, the present invention has been conceived in order to cope with such a subject and, it has an objective to prevent the influence of remaining water vapor from reducing the ratio of specific heats of working gas and deteriorating the thermal efficiency of an engine by separating and removing water vapor contained in exhaust gas after combustion at higher efficiency as compared with the conventional technology, in a working gas circulation engine,

[Solution to Problem]

The above-mentioned objective of the present invention can be attained by a working gas circulation engine which comprises a circulation passage part which connects an inlet port communicated to a combustion chamber and an exhaust port communicated to the combustion chamber in the exterior of the combustion chamber, supplies fuel, oxygen, and working gas to the combustion chamber to burn the fuel in the combustion chamber, and supplies the working gas contained in the exhaust gas discharged through the exhaust port from the combustion chamber to the combustion chamber through the circulation passage part and the inlet port, wherein said working gas circulation engine comprises:

a water vapor condensing means which interposes in said circulation passage part and has an entrance part and an exit part, the water vapor condensing means removes water vapor from gas flowing thereinto through the entrance part from said circulation passage part by condensing water vapor contained in the gas and discharges the gas from the exit part to said circulation passage part, a gas pressure detecting means to detect the pressure of the gas flowing into said water vapor condensing means, and a gas pressure adjusting means to adjust the pressure detected by said gas pressure detecting means.

[Advantageous Effects of Invention]

In accordance with the present invention, since water vapor contained in exhaust gas after combustion can be separated and removed at higher efficiency as compared with the conventional technology in a working gas circulation engine, the influence of remaining water vapor can be prevented from reducing the ratio of specific heats of working gas and deteriorating the thermal efficiency of the engine.

DESCRIPTION OF EMBODIMENTS

Figure 1:
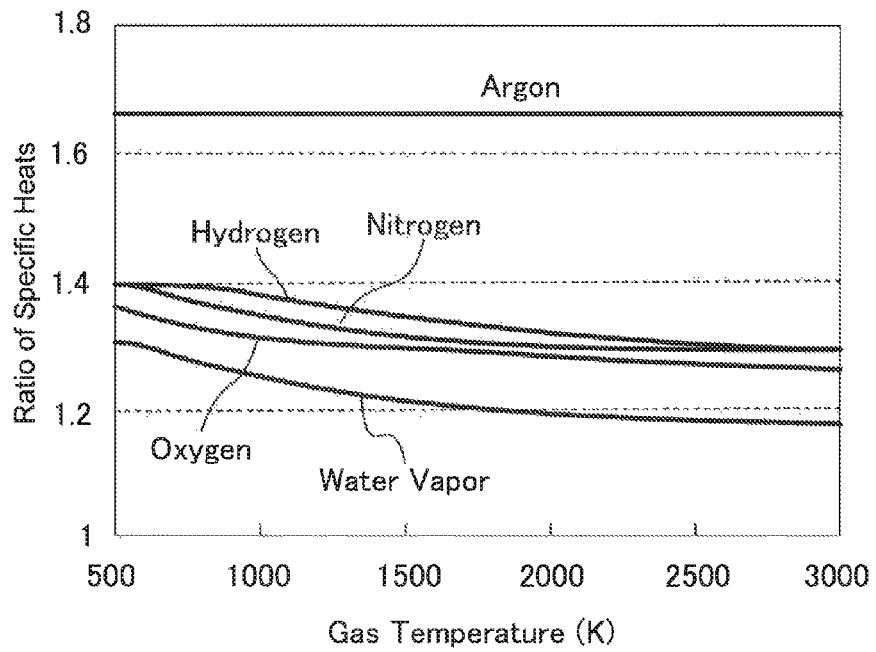
[FIG. 1] A graph for comparing the ratios of specific heats of various gases.

As mentioned above, the present invention has an objective to prevent the influence of remaining water vapor from reducing the ratio of specific heats of working gas and deteriorating the thermal efficiency of an engine by separating and removing water vapor contained in exhaust gas after combustion at higher efficiency as compared with the conventional technology, in a working gas circulation engine.

As a result of wholehearted research for achieving the above-mentioned objective, the present inventors have found an effective tactic which can separate and remove water vapor contained in the working gas (circulating gas) to be re-supplied to a combustion chamber in a working gas circulation engine to a level lower than the amount equivalent to the amount of saturated water vapor corresponding to the temperature of the circulating gas, which is a limit in the conventional technology, and have come to conceive the present invention.

Namely, the first embodiment of the present invention is, a working gas circulation engine which comprises a circulation passage part which connects an inlet port communicated to a combustion chamber and an exhaust port communicated to the combustion chamber in the exterior of the combustion chamber, supplies fuel, oxygen, and working gas to the combustion chamber to burn the fuel in the combustion chamber, and supplies the working gas contained in the exhaust gas discharged through the exhaust port from the combustion chamber to the combustion chamber through the circulation passage part and the inlet port, wherein said working gas circulation engine comprises:

a water vapor condensing means which interposes in said circulation passage part and has an entrance part and an exit part, the water vapor condensing means removes water vapor from gas flowing thereinto through the entrance part from said circulation passage part by condensing water vapor contained in the gas and discharges the gas from the exit part to said circulation passage part, a gas pressure detecting means to detect the pressure of the gas flowing into said water vapor condensing means, and a gas pressure adjusting means to adjust he pressure detected by said gas pressure detecting means.

The above-mentioned working gas circulation engine is a working gas circulation engine in which fuel, oxygen, and working gas are supplied to a combustion chamber and the fuel is burnt while the working gas in exhaust gas discharged from the combustion chamber is circulated (re-supplied) to the combustion chamber through a circulation pathway (circulation passage part). Moreover, in the engine, the pressure of the circulating gas flowing into a water vapor condensing means interposing in the circulation passage part is raised, and water vapor contained in the working gas (circulating gas) to be re-supplied to the combustion chamber is separated and removed efficiently. That is, the present invention is widely applicable to working gas circulation engines using fuel which produces water (water vapor) as combustion product.

Although various gas, such as air, nitrogen, etc., can be used as the above-mentioned working gas, it is desirable to use inactive gas with a large ratio of specific heats, such as argon, helium, etc. When such gas with a large ratio of specific heats is used as working gas, as compared with the case where gas with a comparatively small ratio of specific heats (for example, air, nitrogen, etc.) is used as working gas, an engine can be operated at higher thermal efficiency.

As the above-mentioned fuel, various fuels, such as gasoline, light oil, natural gas, propane, and hydrogen, etc. can be used. However, as mentioned above, the present invention is intended to separate and remove efficiently water vapor contained in circulating gas in a working gas circulation engine using fuel which produces water (water vapor) as combustion product. Therefore, as the above-mentioned fuel, what produces water vapor ($H_2O$) as combustion product is assumed.

The above-mentioned fuel can be stored in a fuel storage part having a configuration appropriate to the phase (for example, liquid phase, gaseous phase, etc.) of the fuel in the operating condition of the above-mentioned engine (for example, a tank, a bomb (cylinder), etc.). Moreover, from the fuel storage part, for example, the above-mentioned fuel may be injected directly into a combustion chamber of the engine (what is called "cylinder injection") or it may be mixed with a working gas beforehand by injecting it into an inlet port of the engine.

An injection means to perform such fuel injection may be a fuel injection valve which opens and closes a jet orifice with a valve object in response to a directions signal from an electrical control unit which will be mentioned later and injects fuel with the pressure of the fuel currently supplied to the injection means when the jet orifice is opened with the valve object. Furthermore, as for the pressure used for injection of fuel, for example, it may be based on the pressure of fuel gas in a fuel tank as a fuel storage part in case fuel is in the gaseous phase, or for example, it may be based on the pressure of fuel raised by a compression machine (for example, a compressor, a pump, etc.) for building up the pressure of fuel. Furthermore, the pressure used for injection of fuel may be regulated by a fuel injection pressure adjusting means (for example, a pressure regulator etc.) interposed between a storage part and an injection means so that it may not become more than a certain set pressure.

Moreover, oxygen used for burning the above-mentioned fuel can be stored in an oxygen storage part, such as a bomb (cylinder) etc., and from the oxygen storage part, for example, it may be injected into a combustion chamber of an engine, or it may be previously mixed with a working gas before being supplied into a combustion chamber of an engine.

Furthermore, the combustion mode of the above-mentioned fuel can be suitably chosen in accordance with the properties of the fuel used, engine specification, etc. More specifically, for example, fuel may be injected directly into a combustion chamber at a predetermined time within a period in which gas containing at least oxygen and working gas is in a high compression state where the gas is compressed in the combustion chamber (what is called "high-pressure injection") to carry out diffuse combustion of the fuel. Moreover, fuel previously mixed with working gas as mentioned above may be lighted by sparks generated from an ignition means disposed in a combustion chamber to carry out spark-ignited combustion.

The above-mentioned water vapor condensing means is a condenser which condense water vapor contained in gas (circulating gas) flowing in from a circulation passage part into condensed water by heat exchange of between the circulating gas and the atmosphere and separates the water vapor which has become the condensed water by the heat exchange from the circulating gas. The condenser may be a water-cooled condenser using cooling water as a coolant, and may be an air-cooled condenser.

As mentioned above, in a working gas circulation engine, it is necessary to remove water vapor contained in circulating gas as much as possible, to suppress the fall in the ratio of specific heats of working gas, and to prevent the thermal efficiency of the engine from falling. However, even if water vapor contained in circulating gas was separated and removed with a condenser as mentioned above, an amount of water vapor equivalent to the amount of saturated water vapor corresponding to the temperature of the circulating gas will remain in the circulating gas. Moreover, if the temperature of circulating gas in a condenser becomes higher for a certain reason, the amount of saturated water vapor in the circulating gas increases, and the amount of the water vapor which remains in the circulating gas will increase.

As a measure against the above-mentioned subject, it can be thought to further improve the cooling capacity of a condenser as the above-mentioned water vapor condensing means. However, such a measure is not desirable since the enlargement and complication, and the increase in a manufacturing cost as the whole system including the engine, such as enlargement of heat radiator (radiator) used for cooling of coolant, extension of equipment for cooling coolant, etc may be concerned.

Then, in the present invention, as mentioned above, the gas pressure adjusting means raises the pressure of the circulating gas which flows into the above-mentioned water vapor condensing means and raises the dew point of the water vapor contained in the circulating gas, and decreases the amount of saturated water vapor in the circulating gas. As a result, the amount of the water vapor separated and removed in the above-mentioned water vapor condensing means increases, and the amount of water vapor contained in the circulating gas to be re-supplied to the combustion chamber can be reduced. Thus, in the working gas circulation engine according to the present invention, the fall of the ratio of specific heats of the circulating gas to be re-supplied to a combustion chamber can be suppressed to the minimum, and high thermal efficiency can be achieved.

The above-mentioned gas pressure detecting means is not limited to a specific system and can be configured to include various types of pressure sensors widely used in the art (for example, a capacitance type pressure sensor, a semiconductor type pressure sensor, etc.). A gas pressure detecting means is configured so as to detect the pressure of the circulating gas which flows into a water vapor condensing means and generate a signal representing the pressure of the circulating gas which flows into a water vapor condensing means.

In addition, as a specific detection method of the pressure of the circulating gas which flows into a water vapor condensing means, a suitable method can be chosen from various methods well-known to a person skilled in the art in accordance with the configuration of an engine, a water vapor condensing means, etc. For example, the pressure of circulating gas can be detected by disposing a gas pressure detecting means in a circulation passage part near a water vapor condensing means (for example, at the entrance, inside, or exit of a water vapor condensing means, etc.).

As mentioned above, since a gas pressure detecting means generates a signal corresponding to the pressure of the circulating gas which flows into a water vapor condensing means, for example, a gas pressure detecting means can be connected to an electrical control unit and can be used for various control by the electrical control unit. Incidentally, an electrical control unit refers to, for example, an electronic device mainly consisting of a well-known microcomputer including a CPU, a storage device, such as ROM, RAM, nonvolatile memory, and an interface. However, the above-mentioned explanation about a gas pressure detecting means and an electrical control unit is merely an exemplification, and the configurations of a gas pressure detecting means and an electrical control unit are not limited to the above-mentioned explanation.

Although various configurations can be used for a gas pressure adjusting means to adjust the pressure detected by the above-mentioned gas pressure detecting means, specific configuration will be mentioned in detail later. In addition, a gas pressure adjusting means can be controlled, for example, by a directions signal (control signal) sent out from the above-mentioned electrical control unit.

By the way, although various gas, such as air, nitrogen, etc., can be used as the above-mentioned working gas, in order for raising the thermal efficiency of an engine and reducing contaminants, such as nitrogen oxide etc., whose emission is required to be suppressed from a viewpoint of environmental protection, it is desirable to use inactive gas of a single atom, for example. Although a helium, neon, argon, etc. belonging to rare gasses can be exemplified as such inactive gas of a single atom, as working gas for an internal-combustion engine, argon is widely used among these, Therefore, the second embodiment of the present invention is a working gas circulation engine according to said first embodiment of the present invention, characterized in that said working gas is argon.

As mentioned above, since the working gas circulation engine according to the second embodiment of the present invention uses as working gas argon which has a high ratio of specific heats and is inactive, the engine can be operated at high thermal efficiency and emission of an environmental pollutant such as nitrogen oxide, etc. can be suppressed.

Moreover, as the above-mentioned fuel, various fuels, such as gasoline, light oil, natural gas, propane, hydrogen, etc., can be used as mentioned above. However, since carbon dioxide ($CO_2$) is also generated as combustion product when using oil fuel including gasoline, it becomes to be necessary to separate and remove carbon dioxide as well from circulating gas. Furthermore, the present invention is intended to separate and remove efficiently water vapor contained in circulating gas in a working gas circulation engine using fuel which produces water (water vapor) as combustion product. Therefore, as the above-mentioned fuel, it is especially desirable to use hydrogen which produces only water vapor ($H_2O$) as combustion product.

Therefore, the third embodiment of the present invention is a working gas circulation engine according to any one of said first and second embodiments of the present invention, characterized in that said fuel is hydrogen.

As mentioned above, the working gas circulation engine according to the third embodiment of the present invention uses as fuel hydrogen which produces only water ($H_2O$) as combustion product. Therefore, in the working gas circulation engine according to the third embodiment of the present invention, it is not necessary to provide any means for separating and removing carbon dioxide contained as combustion products in a working gas circulation engine which uses oil fuel. Furthermore, in the working gas circulation engine according to the third embodiment of the present invention, by efficiently separating and removing water vapor contained in circulating gas, the advantage of the present invention to raise the ratio of specific heats of the circulating gas to be re-supplied to a combustion chamber and the thermal efficiency of the engine can be exerted more effectively.

By the way, as mentioned above, the working gas circulation engine according to the present invention is intended to separate and remove more water vapor in the above-mentioned water vapor condensing means by adjusting the pressure of circulating gas flowing into the above-mentioned water vapor condensing means with a gas pressure adjusting means. Such a gas pressure adjusting means is not limited to specific configuration, but various configurations are applicable. However, from a viewpoint of avoiding the enlargement and complication, and the increase in a manufacturing cost as the whole system including the engine, it is desirable that a gas pressure adjusting means is small, cheap, and easy to be controlled.

Therefore, the fourth embodiment of the present invention is a working gas circulation engine according to any one of said first to third embodiments of the present invention, characterized in that said gas pressure adjusting means is a variable throttle disposed downstream from said water vapor condensing means.

As well-known by a person skilled in the art, since a variable throttle is a small and cheap device with which pressure can be easily controlled, the above-mentioned configuration can fully meet the above-mentioned request. As mentioned above, by disposing a variable throttle in a downstream part rather than a water vapor condensing means in a circulation passage part, the pressure of circulating gas existing in an upstream circulation passage part rather than a variable throttle is raised in accordance with the throttling level of the variable throttle. In addition, a variable throttle can be controlled, for example, by a directions signal (control signal) sent out from the above-mentioned electrical control unit.

That is, in the working gas circulation engine according to the fourth embodiment of the present invention, the pressure of the circulating gas which flows into the water vapor condensing means is raised by the variable throttle disposed downstream from the water vapor condensing means. As a result, since the dew point of the water vapor contained in the circulating gas is raised and the amount of saturated water vapor in the circulating gas is decreased, even if the cooling capacity of the water vapor condensing means is not raised, the amount of the water vapor separated and removed in the water vapor condensing means can be increased. Therefore, the amount of the water vapor contained in the circulating gas to be re-supplied to the combustion chamber is reduced, the ratio of specific heats of the circulating gas is raised, and the thermal efficiency of the engine is improved.

By the way, when gas which has a large ratio of specific heats, such as argon, etc., is adopted as working gas, it is concerned that the pressure in a combustion chamber (cylinder pressure) near a top dead center (TDC) rises too much. As a measure against such concern, it can be thought to reinforce the mechanical strength of an engine so that it can withstand higher cylinder pressure, or, conversely, to design an engine with a lower compression ratio so that the cylinder pressure near TDC may not rise too much. However, even if the former measure is implemented, the weight and manufacturing cost of the engine may be increased, but also the cylinder pressure may rise too much and as a result the cylinder temperature may also rise, and the cooling loss to the wall surface of the combustion chamber may be increased, and thereby the thermal efficiency of the engine may fall, In addition, even if the latter measure is implemented, it may become a factor which produces problems, such as decline in the thermal efficiency of an engine.

In the working gas circulation engine according to the fourth embodiment of the present invention, since a variable throttle disposed downstream from the water vapor condensing means is adopted as a gas pressure adjusting means, the pressure of the circulating gas in the lower stream rather than the variable throttle can decline relatively, and the amount of the circulating gas to be resupplied to a combustion chamber can be reduced. Therefore, too much rise in the pressure in the combustion chamber (cylinder pressure) near a top dead center (TDC) can be suppressed.

Thereby, it becomes unnecessary to foresee the cylinder pressure which rises too much near a top dead center (TDC) to reinforce the mechanical strength of an engine so that the engine can withstand higher cylinder pressure, or, conversely, to set up the compression ratio of an engine lower so that the cylinder pressure near TDC may not rise too much.

In the working gas circulation engine according to the fourth embodiment of the present invention, a small and cheap variable throttle which is easy to be controlled is used as a gas pressure adjusting means from a viewpoint of avoiding the enlargement and complication, and the increase in a manufacturing cost as the whole system including the engine. However, when such restrictions do not exist and only thoroughly removing water vapor from circulating gas is taken into consideration, a configuration in which the pressure of the circulating gas which flows into a water vapor condensing means is adjusted more actively can be also assumed.

That is, the fifth embodiment of the present invention is a working gas circulation engine according to any one of said first to fourth embodiments of the present invention, characterized in that said gas pressure adjusting means is a compression machine disposed upstream of said water vapor condensing means.

As the above-mentioned compression machine, but are not limited to, for example, a compressor, a gas pump, etc. can be used, as long as it can compress circulating gas. Moreover, since the above-mentioned compression machine raises the pressure of the circulating gas which flows into a water vapor condensing means, it needs to be disposed in an upstream part rather than the water vapor condensing means in a circulation passage part. Furthermore, a compression machine as a gas pressure adjusting means in the working gas circulation engine according to the present embodiment and a variable throttle as a gas pressure adjusting means in the working gas circulation engine according to the fourth embodiment of the present invention can be used together. In addition, the compression machine can be controlled, for example, by a directions signal (control signal) sent out from the above-mentioned electrical control unit.

As mentioned above, by disposing a compression machine in an upstream part rather than the water vapor condensing means in a circulation passage part, the pressure of circulating gas existing in a downstream circulation passage part rather than the compression machine is raised in accordance with the operation situation of the compression machine.

That is, in the working gas circulation engine according to the fifth embodiment of the present invention, the pressure of the circulating gas which flows into a water vapor condensing means is raised positively with the compression machine disposed upstream of the water vapor condensing means. As a result, since the dew point of the water vapor contained in the circulating gas is raised and the amount of saturated water vapor in the circulating gas is decreased, even if the cooling capacity of the water vapor condensing means is not raised, the amount of the water vapor separated and removed in the water vapor condensing means can be increased. Therefore, the amount of the water vapor contained in the circulating gas to be re-supplied to the combustion chamber is reduced, the ratio of specific heats of the circulating gas is raised, and the thermal efficiency of the engine is improved.

Moreover, since the above-mentioned compression machine can be raised the pressure of the circulating gas on the side of an inlet port to increase the amount of the circulating gas supplied to a combustion chamber, it can maintain the cylinder pressure appropriately even under low load or in a cold engine to contribute also to preventing unstable combustion of fuel in the combustion chamber under low load or in the cold engine.

By the way, as mentioned above, in the working gas circulation engines according to various embodiments of the present invention, since the pressure of the circulating gas which flows into the water vapor condensing means which interposes in the circulation passage part is raised by the gas pressure adjusting means (for example, a variable throttle, a compression machine such as a compressor, a gas pump, etc.), and thereby the dew point of the water vapor contained in the circulating gas is raised, and the amount of saturated water vapor in circulating gas decreases, even if the cooling capacity of the water vapor condensing means is not raised, the water vapor contained in the circulating gas to be re-supplied to the combustion chamber is separated and removed efficiently.

When the temperature of the circulating gas which flows into a water vapor condensing means rises, if the pressure of the circulating gas which flows into the water vapor condensing means is maintained to the pressure same before the temperature of circulating gas rises, the amount of saturated water vapor in the circulating gas will increase. That is, the amount of the water vapor which remains in the circulating gas after water vapor being separated and removed in the water vapor condensing means increases. As a result, the ratio of specific heats of the circulating gas to be re-supplied to a combustion chamber will fall, and the thermal efficiency of an engine will fall. In order to solve this problem, when the temperature of the circulating gas which flows into a water vapor condensing means rises, it is desirable to adjust the pressure of the circulating gas which flows into the water vapor condensing means in response to the rise in the temperature of the circulating gas.

That is, the sixth embodiment of the present invention is a working gas circulation engine according to any one of said first to fifth embodiments of the present invention;

characterized by further comprising:

a gas temperature detecting means to detect the temperature of the gas adjacent to said water vapor condensing means, and a target gas pressure setting means to set up target gas pressure based on the temperature detected by said gas temperature detecting means, and characterized in that:

said gas pressure adjusting means sets the pressure of the gas which flows into said water vapor condensing means at said target gas pressure.

The above-mentioned gas temperature detecting means is not limited to a specific system and various types of temperature sensors widely used in the art (for example, a ceramic thermistor element, etc.) can be used. A gas temperature detecting means is configured so as to detects the temperature of the gas adjacent to a water vapor condensing means and generate a signal representing the temperature of the gas adjacent to the water vapor condensing means In addition, as a specific detection method of the temperature of the circulating gas adjacent to a water vapor condensing means, a suitable method can be chosen from various methods well-known to a person skilled in the art in accordance with the configuration of an engine, a water vapor condensing means, etc. For example, the temperature of circulating gas can be directly detected by disposing a gas temperature detecting means in the vicinity of a water vapor condensing means in a circulation passage part (for example, at the entrance, inside, or exit of a water vapor condensing means, etc.). Alternatively, the temperature of circulating gas may be indirectly detected by disposing a gas temperature detecting means to detect the temperature of coolant of the water vapor condensing means, As mentioned above, since a gas temperature detecting means generates a signal corresponding to the temperature of the gas adjacent to a water vapor condensing means, for example, a gas temperature detecting means can be connected to the above-mentioned electrical control unit and can be used for various control by the electrical control unit. However, the above-mentioned explanation about a gas temperature detecting means is merely an exemplification, and the configuration of a gas temperature detecting means is not limited to the above-mentioned explanation.

As mentioned above, when the temperature of the circulating gas which flows into a water vapor condensing means rises, if the pressure of the circulating gas which flows into the water vapor condensing means is maintained to the pressure same before the temperature of circulating gas rises, the amount of saturated water vapor in the circulating gas will increase, and the amount of the water vapor which remains in the circulating gas after water vapor being separated and removed in the water vapor condensing means will increase. Therefore, the above-mentioned target gas pressure setting means raises the pressure of the circulating gas which flows into the water vapor condensing means in response to the rise in the temperature of the circulating gas. Thereby, since the increase in the amount of saturated water vapor in the circulating gas at the temperature is prevented, the increase in the amount of the remaining water vapor contained in the circulating gas to be re-supplied to a combustion chamber is prevented. As a result, the ratio of specific heats of the circulating gas to be re-supplied to the combustion chamber can be prevented from falling to lower the thermal efficiency of an engine.

Conversely, since the amount of saturated water vapor decreases and the amount of water vapor separated and removed in a water vapor condensing means increases when the temperature of the circulating gas which flows into the water vapor condensing means falls, it is desirable to lower the pressure of the circulating gas which flows into the water vapor condensing means in response to fall in the temperature of the circulating gas. Thus, by adjusting the pressure of the circulating gas which flows into a water vapor condensing means in response to the temperature change of the circulating gas, it can be suppressed that a gas pressure adjusting means pressurizes the pressure of the circulating gas more than needed. As a result, the above-mentioned configuration can reduce the energy consumed in order to operate a gas pressure adjusting means and the pumping loss (will be mentioned later in detail) resulting from the high pressure of the circulating gas in a circulation passage part, and can be contributed also to the improvement in fuel consumption of an engine.

In the working gas circulation engine according to the present embodiment, a target gas pressure setting means sets up target gas pressure based on temperature detected by a gas temperature detecting means and a gas pressure adjusting means sets the pressure of the gas which flows into a water vapor condensing means at the target gas pressure. More specifically, for example, the above-mentioned target gas pressure setting means receives a measurement signal (detection signal) sent out from a gas temperature detecting means, sets up target gas pressure corresponding to the detection signal, for example, by using data (for example, a data table stored in a storage device with which the above-mentioned electrical control unit is equipped, etc.) showing the relation between predetermined target gas pressure and temperature detected by a gas temperature detecting means, etc., and sends out a directions signal (control signal) corresponding to the target gas pressure. A gas pressure adjusting means receives the control signal and is controlled so that the target gas pressure corresponding to the control signal should be attained.

Here, the above-mentioned predetermined target gas pressure can be suitably set up, based on the thermal efficiency and output, etc. for which an engine is asked, in consideration of the ratio of specific heats of a working gas, etc.

In addition, the target gas pressure setting means may be configured as a separate component, or it may be configured as a part of the above-mentioned electrical control units so as to receive a detection signal and send out a control signal, as mentioned above, through the electrical control unit. However, the above-mentioned explanation about a target gas pressure setting means is merely an exemplification, and the configuration of a target gas pressure setting means is not limited to the above-mentioned explanation.

In the working gas circulation engine according to the sixth embodiment of the present invention, as mentioned above, a target gas pressure setting means prevents the increase in the amount of saturated water vapor in circulating gas by adjusting the pressure of the circulating gas which flows into a water vapor condensing means in response to the temperature change of the circulating gas which flows into the water vapor condensing means. However, from a viewpoint of stabilization of the thermal efficiency of an engine and combustion of fuel in a combustion chamber of the engine, it is desirable to always maintain the amount of water vapor contained in the circulating gas to be re-supplied to a combustion chamber constant.

Therefore, the seventh embodiment of the present invention is a working gas circulation engine according to said sixth embodiment of the present invention, characterized in that;

said target gas pressure setting means sets up target gas pressure so that the amount of water vapor contained in gas discharged from said water vapor condensing means may become a predetermined target amount of water vapor, based on the relation between pressure dew point and temperature detected by said gas temperature detecting means.

In the working gas circulation engine according to the present embodiment, the above-mentioned target gas pressure setting means sets up target gas pressure more strictly. More specifically, for example, the above-mentioned target gas pressure setting means receives a measurement signal (detection signal) sent out from a gas temperature detecting means and sets up target gas pressure corresponding to the detection signal. On this occasion, the above-mentioned target gas pressure setting means sets up target gas pressure so that the amount of water vapor contained in gas discharged from a water vapor condensing means may become a predetermined target amount of water vapor, for example, based on data (for example, a data table stored in a storage device with which the above-mentioned electrical control unit is equipped, etc.) representing the relation between pressure dew point and temperature detected by a gas temperature detecting means, and sends out a directions signal (control signal) corresponding to the target gas pressure. A gas pressure adjusting means receives the control signal and is controlled so that the target gas pressure corresponding to the control signal should be attained.

Here, the above-mentioned predetermined target amount of water vapor can be suitably set up, based on the thermal efficiency and output, etc. for which an engine is asked, in consideration of the ratio of specific heats of a working gas, etc.

As mentioned above, the target gas pressure setting means may be configured as a separate component, or it may be configured as a part of the above-mentioned electrical control units so as to receive a detection signal and send out a control signal, as mentioned above, through the electrical control unit. However, the above-mentioned explanation about a target gas pressure setting means is merely an exemplification, and the configuration of a target gas pressure setting means is not limited to the above-mentioned explanation.

In the working gas circulation engine according to the seventh embodiment of the present invention, as mentioned above, a target gas pressure setting means adjusts strictly the pressure of the gas which flows into a water vapor condensing means in response to the temperature change of the circulating gas which flows into the water vapor condensing means. Thereby, since the amount of water vapor contained in the circulating gas to be re-supplied to a combustion chamber is always maintained constant, the thermal efficiency of the engine and combustion of fuel in the combustion chamber can be stabilized.

By the way, if only efficient separation and removal of water vapor contained in the circulating gas to be re-supplied to a combustion chamber is taken into consideration, it will be desirable to raise the pressure of the circulating gas which flows into a water vapor condensing means as much as possible. However, actually, when the pressure of the circulating gas which flows into a water vapor condensing means is raised without any restriction, there is a possibility that the back pressure in an engine exhaust port as well as the back pressure of various apparatuses such as a pump to circulate the circulating gas (when exists), a compression machine for pressurizing the circulating gas (when exists), an oxygen supplying part for supplying oxygen ($O_2$) to the circulating gas (for example, an oxygen gas tank, an oxygen gas passage, an oxygen gas pressure regulator, an oxygen gas flowmeter, and an oxygen gas mixer, etc. may also be included), and a fuel supplying part for supplying fuel (for example, hydrogen ($H_2$)) to the circulating gas (for example, a fuel tank, a fuel passage, a fuel pressure regulator, a fuel flowmeter, and a fuel mixer, etc. may also be included) when fuel is mixed to working gas and then spark-ignited combustion is carried out may increase too much, large improvement in the strength of various apparatuses (for example, a circulation passage, the main part of an engine, etc.) may become indispensable, and the physical size, weight, etc. thereof may become large.

As mentioned above, in light of operational efficiency of an engine, mechanical strength of an engine component, etc., the pressure of the circulating gas which flows into a water vapor condensing means naturally has an upper limit. Therefore, in the working gas circulation engine according to the present invention, it is also important to control the pressure of the circulating gas so as not to exceed the maximum pressure defined in consideration of the operational efficiency of an engine, the mechanical strength of an engine component, etc.

That is, the eighth embodiment of the present invention is a working gas circulation engine according to any one of said first to seventh embodiments of the present invention, characterized by further comprising;

a maximum gas pressure controlling means to control said gas pressure adjusting means so that the pressure of the gas which flows into said water vapor condensing means may not exceed predetermined maximum pressure.

In the working gas circulation engine according to the present embodiment, the above-mentioned maximum gas pressure controlling means controls a gas pressure adjusting means so that the pressure of the gas which flows into the above-mentioned water vapor condensing means does not exceed the predetermined maximum pressure. More specifically, for example, the above-mentioned maximum gas pressure controlling means receives a measurement signal (detection signal) sent out from a gas pressure detecting means and compares the gas pressure detected from the detection signal with the predetermined maximum pressure, and controls a gas pressure adjusting means so that the pressure of the circulating gas may be the predetermined maximum pressure or less when the pressure of the circulating gas exceeds the predetermined maximum pressure.

On this occasion, the above-mentioned maximum gas pressure controlling means send out a directions signal (control signal) for controlling the pressure of the circulating gas to be the predetermined maximum pressure or less, the control signal may be a signal for directly controlling the gas pressure adjusting means, or may be a signal for indirectly controlling the gas pressure adjusting means by changing target the gas pressure which the above-mentioned target gas pressure setting means sets up. Anyway, the gas pressure adjusting means controls the pressure of the circulating gas so as to be the predetermined maximum pressure or less, based on the control signal sent out from the above-mentioned maximum gas pressure controlling means.

In addition, an mentioned above, the above-mentioned predetermined maximum pressure can be suitably set up, based on the design specification of an engine, etc., in consideration of the operational efficiency of the engine, the mechanical strength of an engine component, etc. Moreover, the maximum pressure may be stored as data referred to by a gas pressure maximum control means on comparison with the pressure of the circulating gas by the gas pressure maximum control means, for example, in a storage device with which the above-mentioned electrical control unit is equipped, etc.

In addition, the maximum gas pressure controlling means may be configured as a separate component, or it may be configured as a part of the above-mentioned electrical control units so as to receive a detection signal and send out a control signal as mentioned above, through the electrical control unit. Moreover, the maximum gas pressure controlling means can be configured as a part of the above-mentioned target gas pressure setting means. However, the above-mentioned explanation about a maximum gas pressure controlling means is merely an exemplification, and the configuration of a maximum gas pressure controlling means is not limited to the above-mentioned explanation.

As mentioned above, in accordance with the present invention, since water vapor contained in exhaust gas after combustion can be separated and removed at higher efficiency as compared with the conventional technology in a working gas circulation engine, the influence of remaining water vapor can be prevented from reducing the ratio of specific heats of working gas and deteriorating the thermal efficiency of the engine.

Hereafter, referring to an accompanying drawing etc., some working gas circulation engines according to various embodiments of the present invention will be explained. However, the explanation which will be mentioned below is provided only for the purpose of exemplification, and the scope of the present invention should not be interpreted as to be limited to the following explanation.

EXAMPLE 1

Figure 4:
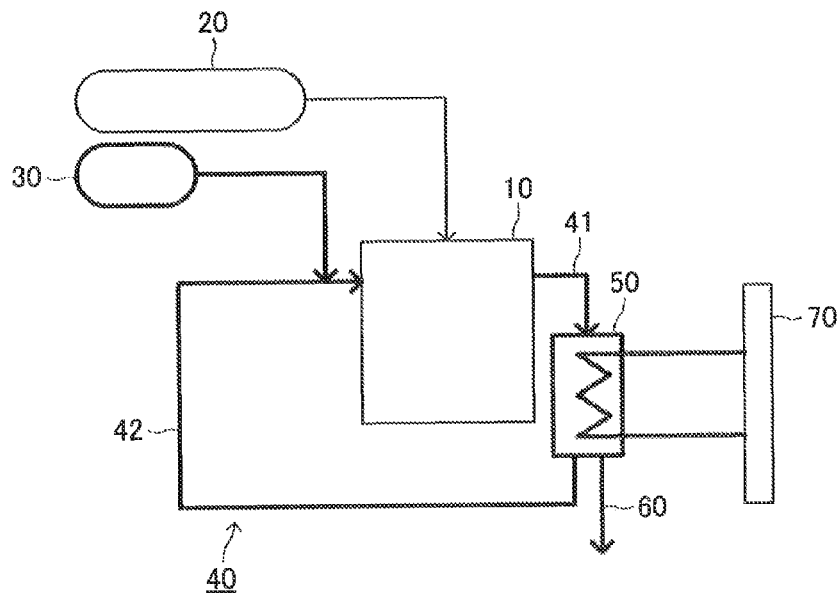
[FIG. 4] A schematic view showing the configuration of a system including a working gas circulation engine according to one embodiment of the present invention.

FIG. 4 is a schematic view showing the configuration of a system including a working gas circulation engine according to one embodiment of the present invention. The system includes a main part 10, a fuel supplying part 20, an oxygen supplying part 30, a circulation passage part (working gas circulation passage part) 40, and a water vapor condensing means 50 of the working gas circulation engine. This engine is a type of engine in which performs diffuse combustion of fuel (for example, hydrogen gas) by supplying oxygen and a working gas (for example, argon gas) to a combustion chamber, compressing this gas to high temperature and high pressure, and injecting the fuel in the gas. In addition, although FIG. 4 shows only the cross section of a specific cylinder of the main part 10 of an engine, other cylinders also have a configuration similar thereto.

The main part 10 of an engine is not limited to a specific configuration and, for example, it may be a piston reciprocation type engine including a cylinder head, a cylinder formed by a cylinder block, a piston which reciprocates in the cylinder, a crankshaft, a connecting rod for connecting the piston and the crankshaft and changing reciprocating movement of the piston into rotational movement of the crankshaft, and an oil pan connected with the cylinder block (shown neither).

In this case, a piston ring is disposed on the lateral face of the piston, and space formed by the cylinder head, the cylinder, and the oil pan is divided by the piston, into a combustion chamber on the side of the top face of the piston and a crankcase which accommodates a crankshaft (shown neither).

An inlet port communicated to the combustion chamber and an exhaust port communicated to the combustion chamber are formed in the cylinder head (shown neither). An intake valve which opens and closes the inlet port is disposed in the inlet port, and an exhaust valve which opens and closes the exhaust port is disposed in the exhaust port (shown neither). Furthermore, a fuel injection valve which injects fuel (for example, hydrogen gas) directly into a combustion chamber is disposed in the cylinder head (not shown).

The fuel supplying part 20 can include a fuel tank (for example, hydrogen gas tank), a fuel gas passage, a fuel gas pressure regulator, a fuel gas flowmeter, and a surge tank, etc. (shown neither). Moreover, the oxygen supplying part 30 can include an oxygen tank (oxygen gas tank), an oxygen gas passage, an oxygen gas pressure regulator, an oxygen gas flowmeter, and an oxygen gas mixer (shown neither).

In addition, about specific configuration and operation of the main part 10 of an engine, the fuel supplying part 20, and the oxygen supplying part 30, since they are well-known, for example, about a working gas circulation-type hydrogen engine etc. in the art, detailed explanation thereof is omitted in the present specification.

The circulation passage part 40 includes a first and second passage parts (first and second channel forming pipe) 41 and 42, and a water vapor condensing means 50 having an entrance part and exit part is interposed between the first passage part 41 and the second passage part 42. The circulation passage part 40 constitutes the "circulation pathway of exhaust gas (working gas contained in exhaust gas)" which connects an exhaust port and an inlet port in the exterior of a combustion chamber.

The first passage part 41 connects the exhaust port and the entrance part of the water vapor condensing means 50. The second passage part 42 connects the exit part of the water vapor condensing means 50 and the inlet port, and in mid course thereof, the oxygen supplying part 30 joins through an oxygen gas mixer (not shown) etc.

The water vapor condensing means 50 includes the entrance part and the exit part of exhaust gas (circulating gas) as mentioned above. Furthermore, the water vapor condensing means 50 includes a cooling-water inlet, a cooling-water outlet, and the condensed water outlet 60, and the heat radiator (radiator) 70 used for cooling of cooling water is interposed in a cooling-water circulation part which connects a cooling-water inlet and a cooling-water outlet.

The water vapor condensing means 50 cools and condensed water contained in exhaust gas (circulating gas) which is introduced from the entrance part and discharged from the exit part, with cooling water which is introduced from the cooling-water inlet and discharged from the cooling-water outlet after passing through the inside of the condenser. The condensed water is discharged outside from the condensed water outlet 60. The gas from which water vapor was removed (separated) is discharged to the circulation passage part 40 from the exit part of the water vapor condensing means 50.

Namely, the water vapor condensing means 50 is "a water vapor condensing means which has an entrance part and an exit part, which has function to remove water vapor from gas flowing thereinto through the entrance part from the circulation passage part 40 by condensing water vapor contained in the gas flowing thereinto through the entrance part and discharge the gas from the exit part to the circulation passage part 40". In addition, although the water vapor condensing means 50 uses a water cooled system condenser using cooling water in the present embodiment, the water vapor condensing means 50 may use any coolants other than water, and it may be equipped with an air cooling condensing part which condenses water vapor in the gas which passes through the inside thereof with air (ventilation of air).

Moreover, although various gases, such as air and nitrogen, can be used as working gas as mentioned above, it is desirable to use inactive gas with a large ratio of specific heats, such as argon, neon, and a helium, etc. When such gas with a large ratio of specific heats is used as working gas, as compared with the case where gas with a comparatively small ratio of specific heats (for example, air, nitrogen, etc.) is used as working gas, an engine can be operated at higher thermal efficiency. In addition to the above, also from a viewpoint to reduce emission of a contaminant, such as nitrogen oxide, for example, and to contribute to environmental protection, it is desirable to use inactive gas. Among these inactive gases, argon is widely used as working gas for an internal-combustion engine.

Furthermore, as mentioned above, as fuel, various fuel, such as gasoline, light oil, natural gas, propane, and hydrogen, can be used. However, the present invention is intended to separate and remove efficiently water vapor contained in circulating gas in a working gas circulation engine using fuel which produces water (water vapor) as combustion products. Therefore, as the above-mentioned fuel, what produces vapor ($H_2O$) is assumed as combustion products. Especially, it is desirable to use hydrogen as fuel from a viewpoint not to emit carbon dioxide ($CO_2$) and to contribute to prevention of global warming.

In addition, in the present embodiment, as mentioned above, a type of engine, in which oxygen and working gas are supplied to a combustion chamber, and the gas is compressed to high temperature and high pressure, and diffuse combustion of the fuel is performed by injecting fuel in the gas, is exemplified. However, in the working gas circulation engine according to the present invention, as mentioned above, various working gas and fuel can be used. Therefore, combustion mode of fuel in a combustion chamber can be suitably chosen in accordance with combination of working gas and fuel which are used, and an engine design specifications (for example, compression ratio etc.). Namely, for some combinations of working gas and fuel which are used and engine design specifications (for example, compression ratio etc.), the present invention can be applied to a type of engine which performs spark-ignited combustion by lighting fuel previously mixed with working gas with sparks generated from an ignition means disposed in the combustion chamber.

The water vapor condensing means 50 is disposed between the first passage part 41 and the second passage part 42, as mentioned above. That is, the entrance part of the water vapor condensing means 50 is connected to the exhaust port of the main part 10 of an engine through the first passage part 41. The exit part of the water vapor condensing means 50 is connected to the inlet port of the main part 10 of an engine through the second passage part 42. Thereby, the water vapor condensing means 50 separates water vapor contained in the exhaust gas (circulating gas) which flows in from the entrance part from non-condensed gas as water and discharges the water outside, and supplies the non-condensed gas from the exit part to the second passage part 42.

In the working gas circulation engine according to the present embodiment, the pressure of the circulating gas which flows into the water vapor condensing means 50 is detected by the gas pressure detecting means (not shown) and adjusted by the gas pressure adjusting means (not shown), and the dew point of water vapor contained in circulating gas is raised, and the amount of saturated water vapor in circulating gas is decreased. As a result, the amount of water vapor separated and removed in the water vapor condensing means 50 increases, and the amount of water vapor contained in the circulating gas to be re-supplied to a combustion chamber of the main part 10 of an engine can be reduced. Thus, in the working gas circulation engine according to the present embodiment, the fall of the ratio of specific heats of the circulating gas resulting from remaining water vapor can be suppressed to the minimum, and high thermal efficiency can be realized.

In addition, as mentioned above, the above-mentioned gas pressure detecting means and gas pressure adjusting means are not limited to specific configurations, but various configurations widely used in the art can be used. The gas pressure detecting means is configured so as to detect the pressure of the circulating gas which flows into the water vapor condensing means 50 and generate a signal representing the pressure of the circulating gas which flows into the water vapor condensing means 50.

In addition, as a specific detection method of the pressure of the circulating gas which flows into the water vapor condensing means 50, a suitable method can be chosen from various methods well-known to a person skilled in the art in accordance with the configurations of the engine and the water vapor condensing means 50, etc. For example, the pressure of circulating gas can be detected by disposing a gas pressure detecting means in the circulation passage part 40 adjacent to the water vapor condensing means 50 (for example, the entrance, inside, or exit of the water vapor condensing means 50, etc.).

As mentioned above, since a gas pressure detecting means generates a signal corresponding to the pressure of the circulating gas which flows into the water vapor condensing means 50, for example, a gas pressure detecting means can be connected to an electrical control unit (not shown) and can be used for various control by the electrical control unit. The gas pressure adjusting means can be also controlled, for example, with a directions signal (control signal) sent out from an electrical control unit.

EXAMPLE 2

Figure 5:
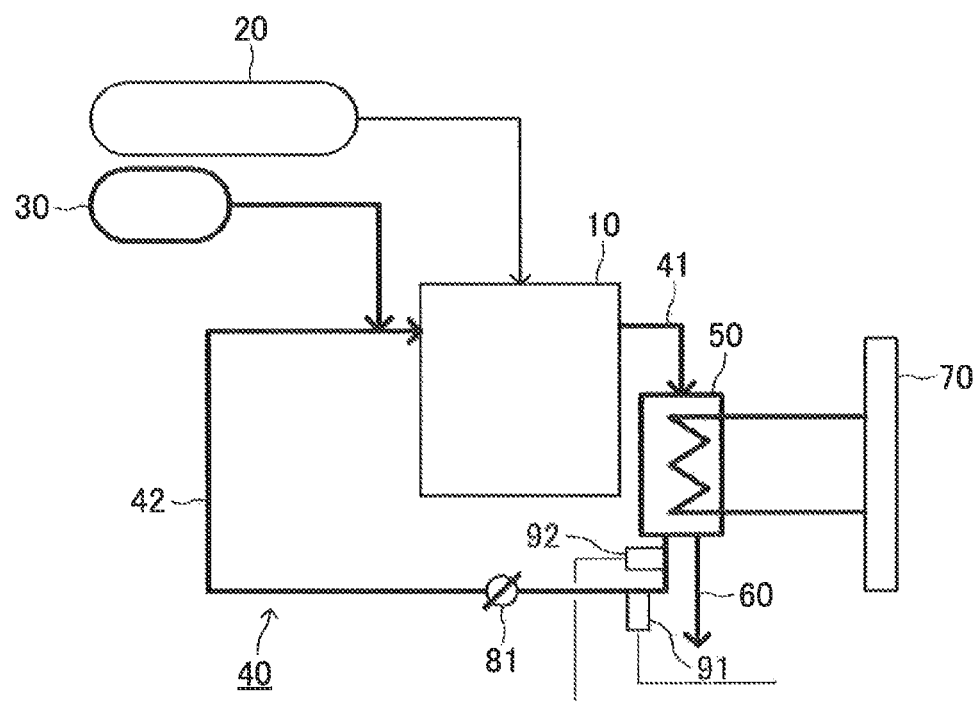
[FIG. 5] A schematic view showing the configuration of a system including a working gas circulation engine according to another embodiment of the present invention.

Next, a working gas circulation engine according to another embodiment of the present invention will be explained in detail, referring to FIG. 5. As mentioned above, FIG. 5 is a schematic view showing the configuration of a system including a working gas circulation engine according to another embodiment of the present invention. In the system shown in FIG. 5, as compared with the system shown in FIG. 4, a gas pressure detecting means 91 is shown, a gas temperature detecting means 92 is added, and a variable throttle 81 is further shown as a gas pressure adjusting means.

That is, in the present embodiment, the gas pressure detecting means 91, the gas temperature detecting means 92, and the variable throttle 81 as a gas pressure adjusting means are formed in the circulation passage part 40 (namely, the second passage part (second channel formation pipe) 42) on the side of the lower stream from the water vapor condensing means 50. As mentioned above, since a variable throttle is small and cheap, and it is an apparatus easy to control the pressure, it is desirable to use a variable throttle as a gas pressure adjusting means from a viewpoint of avoiding the enlargement, complication, and increase in a manufacturing cost as the whole system containing an engine.

The gas temperature detecting means 92 detects the temperature of the gas adjacent to the water vapor condensing means 50, and a target gas pressure setting means (not shown) sets up target gas pressure based on the temperature of the gas detected by this gas temperature detecting means 92. Furthermore, the gas pressure adjusting means (in this embodiment, the variable throttle 81) sets the pressure of the gas which flows into the water vapor condensing means 50 at the target gas pressure.

Then, the execution procedure of the gas pressure adjustment in the present embodiment will be explained in detail below, referring to FIG. 6. As mentioned above, FIG. 6 is a flow chart showing control of the pressure of circulating gas in the system including the working gas circulation engine according to the embodiment shown in FIG. 5. For example, a series of processing shown in this flow chart can be performed by an electrical control unit (not shown) as interrupt processing for every predetermined crank angle.

Figure 6:
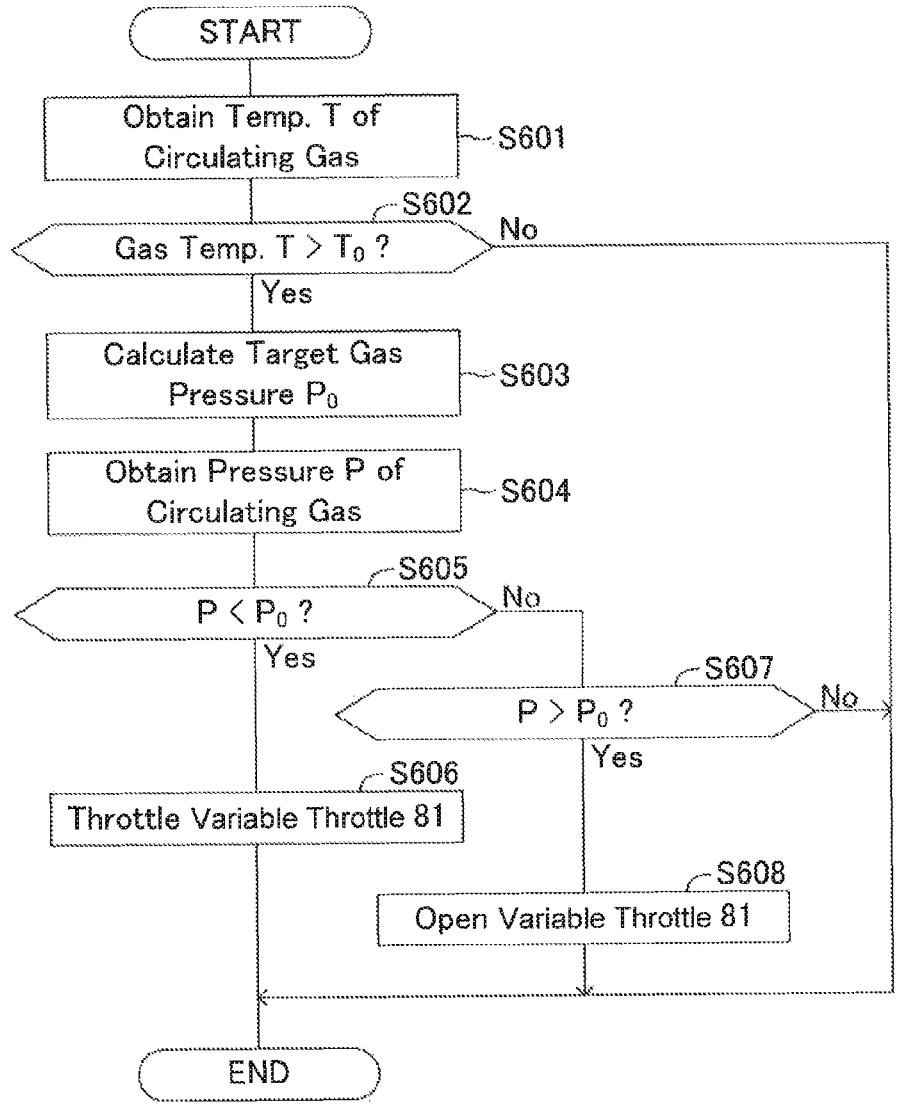
[FIG. 6] A flow chart showing control of the pressure of circulating gas in the system including the working gas circulation engine according to the embodiment shown in FIG. 5.

As shown in FIG. 6, in the present embodiment, the temperature T of the circulating gas adjacent to the water vapor condensing means 50 is obtained by the gas temperature detecting means 92 disposed downstream from the water vapor condensing means 50 (Step S601). Next, it is judged whether the obtained gas temperature T exceeds the predetermined temperature $T_0$ or not (Step S602). When the obtained gas temperature T does not exceed the predetermined temperature $T_0$ (namely, $T \leq T_0$) (Step S602: No), it is judged that there is no necessity to changes the pressure of circulating gas by a gas pressure adjusting means (variable throttle 81 in the present embodiment), and this processing is once ended.

In addition, for example, the above-mentioned "predetermined temperature $T_0$" is a temperature previously determined in consideration of the acceptable amount of water vapor contained in circulating gas, etc., from viewpoints of the ratio of specific heats as the whole circulating gas, etc. For example, when the obtained gas temperature T is less than the predetermined temperature $T_0$, since the amount of water vapor contained in circulating gas is in an acceptable level which is low enough to the extent where the ratio of specific heats as the whole circulating gas is not substantially lowered, a conditional branching as mentioned above may be made based on a view that there is no necessity to change the pressure of circulating gas. However, such conditional branching is not indispensable, the above-mentioned step S602 may be omitted.

On the other hand, when the obtained gas temperature T exceeds the predetermined temperature $T_0$ (namely, $T > T_0$) (Step S602: Yes), in Step S603, the target gas pressure $P_0$ is calculated by a target gas pressure setting means (not shown) based on the gas temperature T detected by the gas temperature detecting means 92.

In the present embodiment, the target gas pressure setting means sets up the target gas pressure $P_0$ so that the amount of water vapor contained in the circulating gas discharged from the water vapor condensing means 50 may be a predetermined target amount of water vapor, based on the relation between the pressure dew point and the gas temperature T detected by the gas temperature detecting means 92 and the relation between the amount of saturated water vapor in the circulating gas at each temperature and the gas temperature T detected by the gas temperature detecting means 91. Moreover, the above-mentioned predetermined target amount of water vapor can be suitably set up, as mentioned above, in consideration of the ratio of specific heats of the working gas, etc., based on the thermal efficiency, an output, etc. for which an engine is asked.

Figure 2:
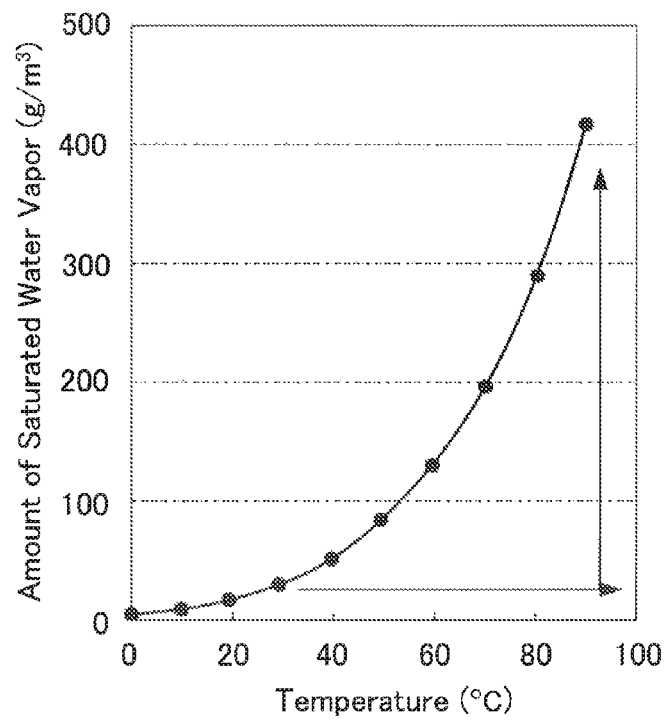
[FIG. 2] A graph showing the relation of the amount of saturated water vapor to temperature.
Figure 3:
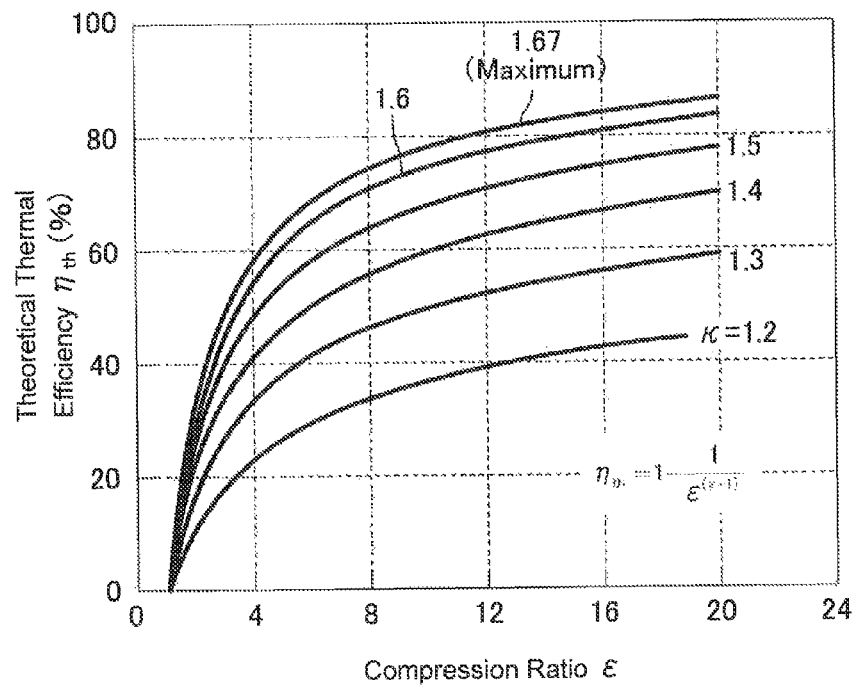
[FIG. 3] A graph showing the relation of the theoretical thermal efficiency to the compression ratio in the engine which uses working gases with various ratios of specific heats.
Figure 7:
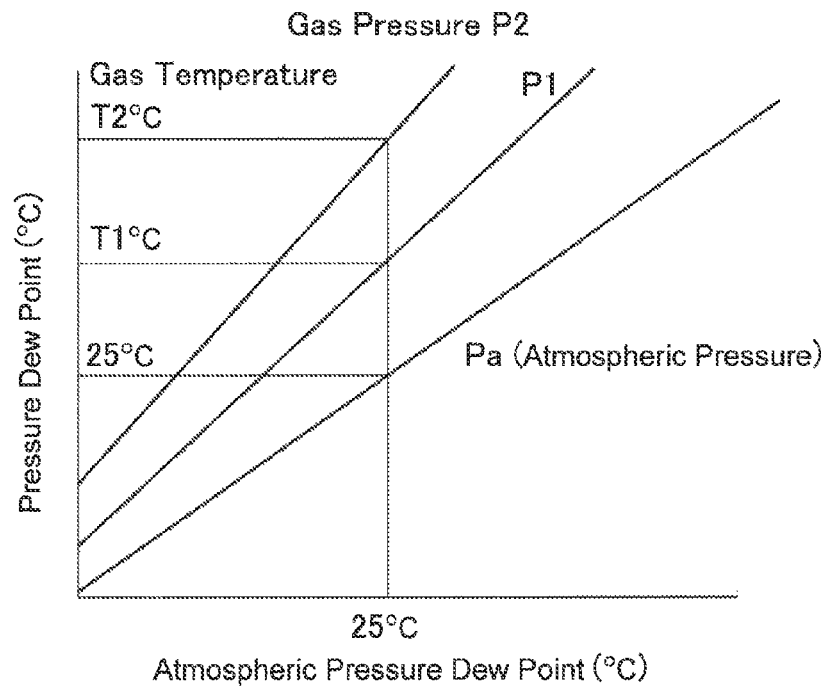
[FIG. 7] A graph showing the relation of the pressure dew point and the atmospheric pressure dew point at various pressures.

Here, referring to FIG. 7, the relation between the gas temperature T and the pressure dew point. As mentioned above, FIG. 7 is a graph showing the relation of the pressure dew point and the atmospheric pressure dew point at various pressures, In the graph shown in FIG. 7, the horizontal axis represents the atmospheric pressure dew point (° C.), and the vertical axis represents the pressure dew point (° C.). Moreover, T1 and T2 described in the graph show the temperature of circulating gas, and 25° C.<T1<T2. Furthermore, Pa, P1, and P2 described in the graph show the pressure of circulating gas, and Pa<P1<P2. As shown in FIG. 7, the higher the pressure of circulating gas is, the larger the inclination of the straight line representing the relation of the pressure dew point o the atmospheric pressure dew point is. In other words, when the amount of saturated water vapor equivalent to a certain specific atmospheric pressure dew point (for example, 25° C.) should be attained, the higher the pressure of circulating gas is, the higher the dew point becomes (the amount of saturated water vapor which is equivalent to the atmospheric pressure dew point is attained at higher gas temperature), Therefore, the target gas pressure $P_0$ can be determined by determining the atmospheric pressure dew point which attains the target amount of water vapor, for example, from the relation of the amount of saturated water vapor to temperature like the graph shown in FIG. 2, and next obtaining the pressure of the circulating gas at which the pressure dew point corresponds to the target atmospheric pressure dew point from the relation of the pressure dew point to the atmospheric pressure dew point like the graph shown in FIG. 7.

In addition, the relation between the pressure dew point and the gas temperature T detected by the gas temperature detecting means 92 and the relation between the amount of saturated water vapor at each temperature and the gas temperature T detected by the gas temperature detecting means 91 are may be stored as data (for example, data table etc.) showing the relation in a storage device with which an electrical control unit (not shown) is equipped, etc. so that the target gas pressure setting means can referred thereto when the target gas pressure $P_0$ is set up.

Next, in Step S604, the pressure P of the circulating gas which flows through the water vapor condensing means 50 is obtained by the gas pressure detecting means 91 disposed downstream from the water vapor condensing means 50. Next, it is judged whether the obtained gas pressure P is lower than the above-mentioned target gas pressure $P_0$ or not (Step S605), When the obtained gas pressure P is lower than the above-mentioned target gas pressure $P_0$ (namely, $P<P_0$) (Step S605: Yes), the variable throttle 81 which is a gas pressure adjusting means is narrowed down (Step S606), and the pressure P of the circulating gas is raised so that it may become the target gas pressure $P_0$.

On the other hand, when the obtained gas pressure P is not lower than the above-mentioned target gas pressure $P_0$ (namely, $P \geq P_0$) (Step S605: No), it is judged whether the obtained gas pressure P is higher than the above-mentioned target gas pressure $P_0$ or not (Step S607), When the obtained gas pressure P is higher than the above-mentioned target gas pressure $P_0$ (namely, $P>P0$) (Step S607: Yes), the variable throttle 81 which is a gas pressure adjusting means is opened (Step S608), and the pressure P of circulating gas is lowered so that it may become the target gas pressure $P_0$.

On the other hand, when the obtained gas pressure P is not higher than the above-mentioned target gas pressure $P_0$ (Step S607: No), since it means that the obtained gas pressure P is equal to the above-mentioned target gas pressure $P_0$ (namely, $P=P0$) and there is no necessity to change the pressure P of the circulating gas, this processing is once ended without adjusting the throttling level of the variable throttle 81.

In the present embodiment, as mentioned above, the pressure P of the circulating gas is controlled by the variable throttle 81 disposed downstream from the water vapor condensing means as a gas pressure adjusting means, so that the pressure dew point may correspond to the temperature T of the circulating gas which flows into the water vapor condensing means 50. Thereby, since the amount of water vapor contained in the circulating gas to be re-supplied to a combustion chamber is always maintained constant, stabilization of the thermal efficiency of an engine and combustion of fuel in a combustion chamber can be realized.

Moreover, as mentioned above, in the present embodiment, since the variable throttle 81 disposed downstream from the water vapor condensing means 50 is adopted as a gas pressure adjusting means, the pressure of the circulating gas in the lower stream rather than the variable throttle 81 is relatively lowered, and the amount of the circulating gas to be re-supplied to a combustion chamber can be reduced. Therefore, since it can be suppressed that the pressure (cylinder pressure) in the combustion chamber near a top dead center (TDC) rises too much, such benefits that it becomes unnecessary to foresee the cylinder pressure which rises too much near TDC to reinforce the mechanical strength of an engine so that the engine can withstand higher cylinder pressure, or, conversely, to set up the compression ratio of an engine lower so that the cylinder pressure near TDC may not rise too much, can be obtained.

EXAMPLE 3

Figure 8:
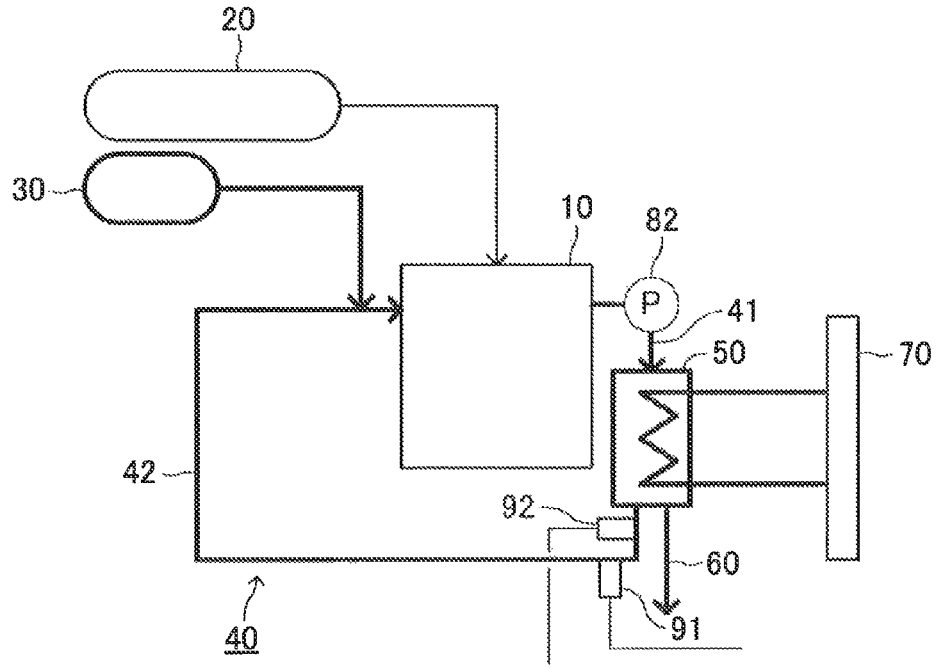
[FIG. 8] A schematic view showing the configuration of a system including a working gas circulation engine according to another embodiment of the present invention.

Furthermore, the working gas circulation engine according to another embodiment of the present invention will be explained in detail, referring to FIG. 8. As mentioned above, FIG. 8 is a schematic view showing the configuration of a system including a working gas circulation engine according to another embodiment of the present invention. More specifically, in the system shown in FIG. 8, a compression machine 82 disposed in the upper stream side of the water vapor condensing means 50 is adopted as a gas pressure adjusting means instead of the variable throttle 81 disposed in the lower stream side of the water vapor condensing means 50 in the system shown in FIG. 5.

As mentioned above, as the compression machine 82, as long as circulating gas can be compressed, but not limited thereto, for example, a compressor, a gas pump, etc. can be used. Moreover, since a compression machine raises the pressure of the circulating gas which flows into the water vapor condensing means 50, it is disposed in an upstream part rather than the water vapor condensing means 50. Furthermore, the compression machine 82 as a gas pressure adjusting means in the working gas circulation engine according to the present embodiment may be used together the variable throttle 81 as a gas pressure adjusting means in the working gas circulation engine according to Example 2. In addition, the compression machine 82 may be controlled, for example, by a directions signal (control signal) sent out from the above-mentioned electrical control unit.

The execution procedure of the gas pressure adjustment in the present embodiment may be similar to that in the case where the variable throttle 81 is used as a gas pressure adjusting means. In the flow chart shown in FIG. 6, Step S606 and Step 608 correspond to a processing to "throttle the variable throttle 81" and a processing to "open the variable throttle 81" respectively. By replacing these processing with a processing to "turn ON the compression machine 82" and a processing to "turn OFF the compression machine 82" respectively, the pressure P of circulating gas is controlled by the compression machine 82 disposed upstream of the water vapor condensing means as a gas pressure adjusting means so that it may become the pressure dew point corresponding to the temperature T of the circulating gas which flows into the water vapor condensing means 50. Thereby, since the amount of water vapor contained in the circulating gas to be re-supplied to a combustion chamber is always maintained constant, stabilization of the thermal efficiency of an engine and combustion of fuel in the combustion chamber can be realized.

Moreover, since the compression machine 82 can raise the pressure of the circulating gas on the side of an engine inlet port to increase the amount of the circulating gas supplied to a combustion chamber, it can maintain the cylinder pressure appropriately even under low load or in a cold engine to contribute also to preventing unstable combustion of fuel in the combustion chamber under low load or in the cold engine.

Furthermore, in any one of the above-mentioned Examples, as mentioned above, the upper limit of the pressure of circulating gas can be determined in consideration of the operational efficiency of an engine and the mechanical strength of an engine component, etc.

As mentioned above, in accordance with the present invention, in a working gas circulation engine, since the water vapor contained in exhaust gas after combustion can be separated and removed at higher efficiency as compared with the conventional technology, the influence of remaining water vapor can be prevented from reducing the ratio of specific heats of working gas and deteriorating the thermal efficiency of an engine.

Although some embodiments with specific configurations and combinations of execution procedures have been explained above for the objective of explaining the present invention, the scope of the present invention is not limited to these exemplary embodiments, various modifications can be properly added thereto within the limits of the matter described in the claims and specification.

[Reference Signs List]

10: engine main part, 20: fuel supplying part, 30: oxygen supplying part, 40: circulation passage part, 41: first passage part (first channel forming pipe), 42: second passage part (second channel forming pipe), 50: water vapor condensing means, 60: condensed water outlet, 70: heat radiator (radiator), 81: variable throttle, 82: a compression machine, 91: gas pressure detecting means, and 92: gas temperature detecting means.

The invention claimed is:

1. A working gas circulation engine which comprises a circulation passage part which connects an inlet port communicated to a combustion chamber and an exhaust port communicated to the combustion chamber in the exterior of the combustion chamber, supplies fuel, oxygen, and working gas to the combustion chamber to burn the fuel in the combustion chamber, and supplies the working gas contained in the exhaust gas discharged through the exhaust port from the combustion chamber to the combustion chamber through the circulation passage part and the inlet port, wherein said working gas circulation engine comprises:

a water vapor condensing means which interposes in said circulation passage part and has an entrance part and an exit part, the water vapor condensing means removes water vapor from gas flowing thereinto through the entrance part from said circulation passage part by condensing water vapor contained in the gas and discharges the gas from the exit part to said circulation passage part, a gas pressure detecting means to detect the pressure of the gas flowing into said water vapor condensing means, and a gas pressure adjusting means to adjust the pressure detected by said gas pressure detecting means.

2. A working gas circulation engine according to claim 1, wherein said working gas is argon.

3. A working gas circulation engine according to claim 1, wherein said fuel is hydrogen.

4. A working gas circulation engine according to claim 1, wherein said gas pressure adjusting means is a variable throttle disposed downstream from said water vapor condensing means.

5. A working gas circulation engine according to claim 1, wherein said gas pressure adjusting means is a compression machine disposed upstream of said water vapor condensing means.

6. A working gas circulation engine according to claim 1, further comprising:

a gas temperature detecting means to detect the temperature of the gas adjacent to said water vapor condensing means, and a target gas pressure setting means to set up target gas pressure based on the temperature detected by said gas temperature detecting means, wherein:

said gas pressure adjusting means sets the pressure of the gas which flows into said water vapor condensing means at said target gas pressure.

7. A working gas circulation engine according to claim 6, wherein:

said target gas pressure setting means sets up target gas pressure so that the amount of water vapor contained in gas discharged from said water vapor condensing means may become a predetermined target amount of water vapor, based on the relation between pressure dew point and temperature detected by said gas temperature detecting means.

* * * * *